United States Patent [19]

Hara et al.

[11] Patent Number: 4,671,869
[45] Date of Patent: Jun. 9, 1987

[54] FILTER DEVICE

[75] Inventors: Akira Hara; Hiraku Ohnuma, both of Kanagawa; Toshisaburo Takagi, Saitama, all of Japan

[73] Assignee: Baldwin-Japan Ltd., Tokyo, Japan

[21] Appl. No.: 739,233

[22] Filed: May 30, 1985

[30] Foreign Application Priority Data

Jun. 1, 1984 [JP] Japan ............................... 59-112838

[51] Int. Cl.⁴ ...................... B01D 21/08; B01D 21/34
[52] U.S. Cl. .................................... 210/119; 210/121; 210/138; 210/525; 210/540
[58] Field of Search ................... 210/97, 119, 138, 89, 210/109, 139, 140, 525, 511, 540, 121, 122-124, 126-129

[56] References Cited

U.S. PATENT DOCUMENTS

| | | | |
|---|---|---|---|
| 3,666,102 | 5/1972 | Blanchard | 210/138 |
| 3,894,949 | 7/1975 | Enzmann | 210/540 |
| 4,001,118 | 1/1977 | Enzmann | 210/540 |
| 4,033,866 | 7/1977 | Enzmann | 210/511 |

Primary Examiner—Frank Sever
Attorney, Agent, or Firm—Robbins & Laramie

[57] ABSTRACT

A filter device suitable for use in cleaning dampening water used in an offset press. The filter device has a tank in which are defined three sections: a stirring tank section, a floating tank section and a discharging tank section. The floating tank section and the discharging tank section are communicated with each other through a passage at their lower regions. The passage is adapted to be selectively closed by a shut-off device which is operated periodically under the control of a timer. A floating contaminant removing opening es positioned above the water level in the floating tank section. The contaminated water is poured into the stirring tank section through a bubbling means so that contaminants are adsorbed by the bubbles. The bubbles adsorbing the contaminants are allowed to float in the upper region of water in the floating tank section. When the passage is shut off by the shut-off device, the water level in the floating tank section is raised so that the contaminants are removed together with the bubbles through the floating matter removing opening. On the other hand, the cleaned water free of contaminants flows into the discharging tank section through the passage and discharged outside the tank so as to be recirculated to the offset through a filter.

12 Claims, 6 Drawing Figures 4,671,869

FILTER DEVICE

BACKGROUND OF THE INVENTION

1. Field of the Invention

The present invention relates to a filter device and, more particularly, to a ladder filter for cleaning dampening water used in offset printing.

2. Description of the Related Art

In offset printing, the offset press is supplied with a liquid which contains various chemicals. This liquid is generally referred to as "dampening water". During the operation of the offset press, the dampening water is inevitably contaminated by printing ink and paper dusts. Since the contaminated dampening water deteriorates the printing surface of the press undesirably, it is essential to clean the dampening water by a suitable means.

An apparatus called "ladder filter" is known as an apparatus for cleaning the dampening water. As shown in FIG. 6, a typical conventional ladder filter has a tank 30 in which are formed a stirring section 32, a floating section 34 and a discharge section 36 through which the contaminated dampening water flows successively such as to be cleaned before it reaches the discharge section 36.

The dampening water is bubbled by a bubbling plate 40 before it flows into the stirring section 32 of the tank 30. The ink, paper dusts and other contaminants (referred to as "contaminants" inclusively, hereinunder) suspended by the dampening water attach to the bubbles in the stirring section 32. The bubbles tend to gather around a first partition plate 42 and a second partition plate 44 which define respective sections in the tank 30, and the water is cleaned by removing these bubbles. In the conventional ladder filter, however, the removal of the bubbles is done by human labour at a suitable period, so that the cleaning efficiency is impaired. In addition, there is a tendency that the painful work for removing the bubbles is often ignored resulting in an imperfect cleaning of the dampening water.

On the other hand, Japanese Utility Model Laid-Open No. 39649/1984 discloses a ladder filter having a floating matter removing pipe which opens at a level slightly below the liquid level in the floating section 34 of the tank 30. In this ladder filter, since the opening through which the floating matters are discharged is positioned below the liquid level, a large quantity of dampening water is discharged together with the floating matters, so that the consumption of the dampening water is increased correspondingly. In addition, the efficiency of removal of the floating matters is rather low because the area of the opening of the removing pipe is small.

SUMMARY OF THE INVENTION

Accordingly, an object of the invention is to provide a filter device capable of automatically removing the floating contaminants and cleaning the dampening water at a high cleaning efficiency, while minimizing the consumption of the dampening water.

To this end, the invention provides a filter device for cleaning a liquid comprising a stirring tank section in which the liquid is bubbled and the contaminants suspended by the liquid are adsorbed by the bubbles, a floating tank section provided at the downstream side of the stirring tank section as viewed in the direction of flow of the liquid, the bubbles adsorbing the contaminants being allowed to float in the floating tank section, a discharging tank section disposed at the downstream side of the floating tank section, a floating contaminant removing means for removing said contaminants absorbed in said floating bubbles, said means positioned above a liquid level of said floating tank section, and a liquid level regulating means for regulating the liquid level of said floating tank section, whereby when the liquid level of said floating tank section is raised by said liquid level regulating means up to a position of said floating contaminant removing means, said contaminants adsorbed in said floating bubbles are removed through said floating contaminant removing means.

According to the present invention, a dampening water circulating system for cleaning dampening water used in an offset press is further provided wherein the filter device as disclosed above is communicated with a reserve tank with a circulating pump means for circulating the liquid free from the contaminants to the offset press.

DESCRIPTION OF THE PREFERRED EMBODIMENTS

A preferred embodiment of the invention will be described hereinunder with reference to the accompanying drawings.

Figure 1:
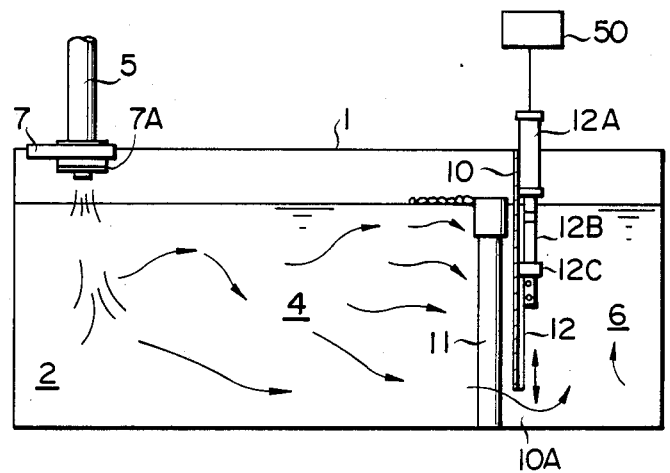
FIG. 1 is a schematic illustration of an essential portion of a first embodiment of the invention.
Figure 2:
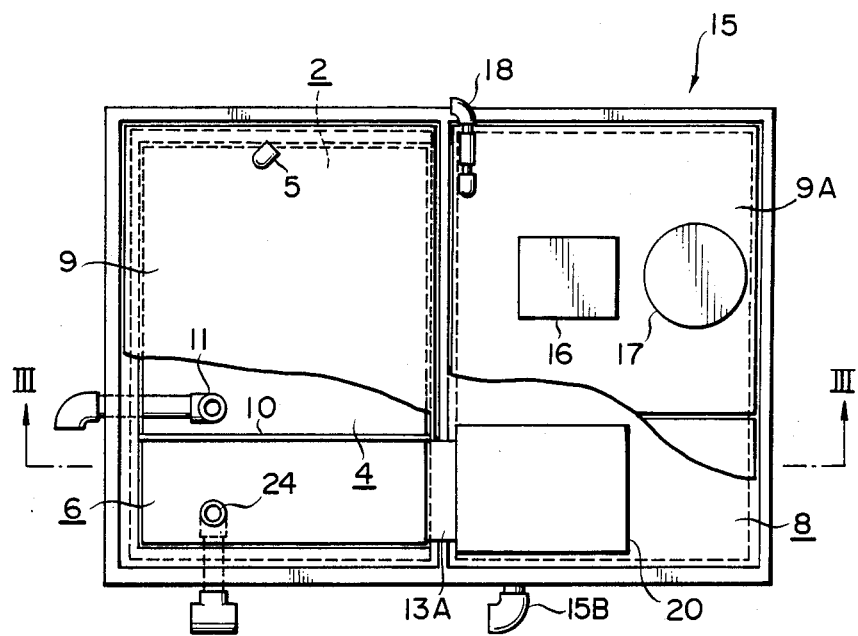
FIG. 2 is a partly cut-away plan view of the embodiment shown in FIG. 1.
Figure 3:
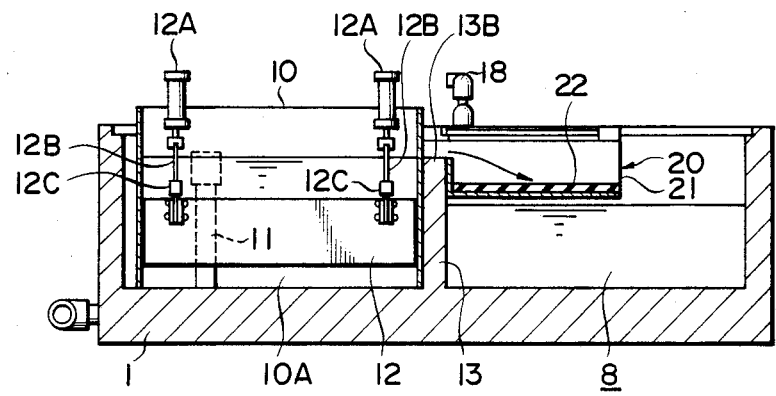
FIG. 3 is a sectional view taken along the line III—III of FIG. 2.

Referring first to FIGS. 1 to 3, a first embodiment of a filter device in accordance with the invention, intended for cleaning the dampening water from printing machine such as an offset press, has a tank 1 in which are formed successively a stirring tank section 2, a floating tank section 4 and a discharging tank section 6. The tank 1 is formed integrally with a circulating device 15. The contaminated dampening water from the printing machine is introduced into the tank 1 through an inlet pipe 5 and is made to flow successively through the stirring tank section 2, floating tank section 4 and the discharging tank section 6 to a reserve tank 8 outside the tank 1, and is supplied to the printing machine by the circulating device 15.

A cover member 7 is provided on the portion of the tank 1 where the inlet pipe 5 is connected to the tank 1. The dampening water flowing into the tank 1 is bubbled as it flows through a bubbling plate 7A attached to the cover plate 7 before it is poured into the stirring tank section 2. As a result, bubbles are formed in the liquid within the stirring tank section 2 and the contaminants are adsorbed by the bubbles. Consequently, the contaminants are introduced into the floating tank section 4 together with the bubbles. The floating tank section 4 and the discharging tank section 6 downstream therefrom are separated from each other by a partition plate 10. However, the partition plate 10 does not reach the bottom of the tank 1, so that these tank sections 4 and 6 are communicated with each other through a passage 10A formed below the partition plate 10 at the lower portion of the tank 1. The bubbles adsorbing the contaminants are prevented by the partition plate 10 from flowing into the discharging tank section 6 so that they tend to concentrate to the region in the vicinity of the partition plate 10.

The floating tank section 4 is provided with a floating contaminant removing means 11 in the form of a drain pipe having an open end positioned above the liquid level and extending to the outside of the tank 1. A gate plate 12 serving as a shut-off means is adapted to slide along the partition plate 10. A plurality of pneumatic cylinders 12A are connected to the gate plate 12 through connecting members 12B to which is secured a slide guide 12C. In operation, the gate plate 12 slides in accordance with the operation of the pneumatic cylinders 12A such as to shut-off the passage 10A formed below the partition plate 10 thereby interrupting the communication between the floating tank section 4 and the discharging tank section 6. When this passage 10A is closed, the water level in the floating tank section 4 is raised so that the floating matters are allowed to flow into the floating matter removing pipe 11. Preferably, the pneumatic cylinders 12A are operated at a predetermined time interval such as to close the passage 10A for a predetermined period of time. The operation of the pneumatic cylinders 12A is controlled by a timer 50 such as to operate intermittently. The timer 50 is adjustable to vary the time interval and the opening time duration in accordance with the conditions such as the extent of contamination of the dampening water and the rate of circulation of the same.

The dampening water from the discharging tank section 6 overflows through a notch 13A in the top end of the partition wall 13 into the reserve tank 8 outside the tank 1, through a filter 20. The filter 20 has a frame 21 with a mat 22 of a specific material such as polyurethane laid on the bottom thereof. The dampening water is cleaned without fail as it flows through the mat 22. The dampening water in the reserve tank 8 is fed back to the printing machine through a feed pipe 18 by means of a pump 17, after adjustment of the density by a dampening water adjusting device 16. The aforementioned circulating device 15 is constituted by the dampening water adjusting device 16, pump 17, reserve tank 8, feed pipe 18 leading to the printing machine, inlet pipe 5 leading from the printing machine, and the tank 1.

As will be seen from FIG. 2, the dampening water adjusting device 16 and the pump 17 are secured to a cover member 9A attached to the reserve tank 8.

A drain port 24 is formed in the bottom of the discharging tank section 6 and a drain pipe 15B leading from the drain port 24 is connected to the circulating device 15.

In the described embodiment, the pneumatic cylinders 12A are intermittently operated by the timer 50 such as to close the passage 10A by the gate plate 12 so that the water level in the floating tank section 4 is raised to allow an automatic removal of the floating bubbles adsorbing the contaminants through the floating contaminant removing pipe 11. Consequently, the operators are relieved from laborious work for scooping the floating bubbles. In addition, the timer is adjustable to select suitable time interval and time duration of operation of the pneumatic cylinders, i.e., the time interval and time duration of shutting off of the passage 10A, so that the wasting of the dampening water and, hence, the total consumption of the dampening water are minimized advantageously.

Figure 4:
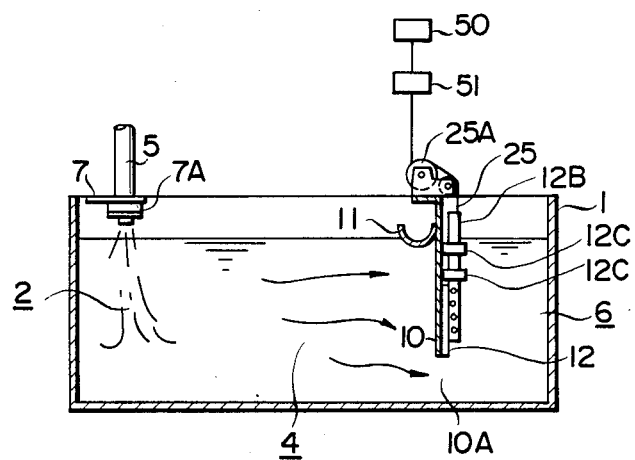
FIG. 4 is a sectional view of an essential part of a second embodiment.

FIG. 4 is a vertical sectional view of an essential portion of a second embodiment of the invention. In this embodiment, a floating contaminant removing trough 11 has a substantially semi-cylindrical member which is disposed horizontally such that its open side is directed upwardly. This semi-cylindrical member is arranged perpendicularly to the direction of flow of the dampening water and is extended outside the tank 1. With this arrangement, the inlet area for the floating matters is increased to permit an efficient catching and removal of the floating matters.

In the described embodiment of the invention, the gate plate 12 can slide by the force of gravity in the direction for closing the passage 10A by virtue of the slide guides 12C which are provided on the connecting members 12B secured to the gate plate 12. A rope 25 which is connected at its one end to each connecting member 12B is wound on a pulley 25A provided on the partition plate 10. The pulley 25A is adapted to be driven by a motor 51 with a reduction gear which in turn is adapted to be operated under the control of the timer 50. The sliding motion of the gate plate 12 is controlled by the tension generated in the rope 25 as a result of rotation of the pulley 25A. Other portions are materially identical to those of the first embodiment so that the same reference numerals are used to denote such same portions and detailed description thereof is omitted.

Figure 5:
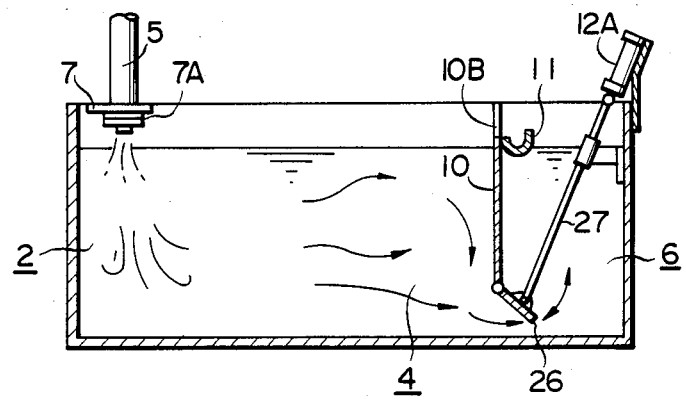
FIG. 5 is a sectional view of an essential part of the third embodiment.
Figure 6:
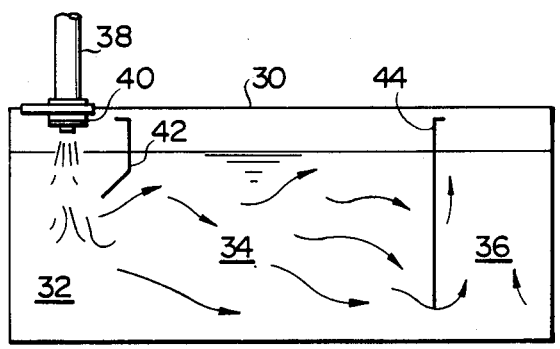
FIG. 6 is a schematic illustration of a conventional filter device.

FIG. 5 shows a third embodiment of the invention. In this embodiment, an opening 10B is formed in the portion of the partition plate 10 above the liquid level, and a substantially semi-cylindrical trough member constituting the floating contaminant removing trough 11 is attached to the surface of the partition plate 10 facing the discharging tank section 6 such as to extend horizontally with its upper edge flush with the lower edge of the opening 10B so that floating contaminants can be guided to the trough 11. This embodiment employs a swingable gate plate 26 pivotally secured to the lower end of the partition plate 10 and adapted to be swung by the action of pneumatic cylinders 12A through long arms 27. Other portions are materially identical to those of the first embodiment so that these portions are denoted by the same reference numerals and the detailed description of these portions is omitted.

Although the invention has been described through specific forms, it is to be noted here that the described embodiments are not exclusive and various changes and modifications may be imparted thereto without departing from the scope of the invention.

For instance, although in the described embodiments the pneumatic cylinders 12A or the motor 51 with reduction gear are controlled by a timer for the purpose of effecting an automatic periodical removal of the floating matters, this is not essential and the shut-off means such as the gate plate may be operated whenever desired, through the manipulation of a manual switch which is arranged to turn on the pneumatic cylinders or motor.

Further, although the described embodiments show the arrangements in which the partition plate 10 is provided with the slidable gate plate 12 or the swingable gate plate 26, the partition plate 10 may be mounted slidably in vertical direction onto the inner wall of the tank 1, so that the partition plate 10 itself slides vertically by the pneumatic cylinders 12A or the like so as to selectively close the passage from the floating tank section 4 to the discharging tank section 6.

Other changes and modifications are still possible within the spirit of the invention which is limited solely by the appended claims.

What is claimed is:

1. A filter device comprising means for removing suspended contaminants from a supply of liquid flowing therethrough while minimizing consumption of the supply drawn off with the suspended contaminants including:
   a stirring tank section adapted to be supplied with the contaminated liquid and means feeding the stirring tank section with the liquid arranged to form bubbles of the liquid therein and to allow the contaminants suspended by said liquid to be adsorbed by said bubbles;
   a floating tank section formed at a downstream side of said stirring tank section as viewed in the direction of the flow of said liquid and arranged to allow said bubbles adsorbing the contaminants to float in an upper region of the liquid therein;
   a discharging tank section communicated with said floating tank section at lower portions thereof through a passage such that the liquid relatively free of contaminants is introduced from the lower portion of said floating tank section into said discharging tank section through said passage;
   a floating contaminant removing means for removing said contaminants adsorbed in said floating bubbles, said floating contaminant removing means normally positioned above a liquid level of said floating tank section;
   a liquid level regulating means for regulating the liquid level of said floating tank section, so that when the liquid level of said floating tank section is raised by said liquid level regulating means up to the position of said floating contaminant removing means, said contaminants adsorbed in said floating bubbles are removed through said floating contaminant removing means.

2. A filter device according to claim 1, wherein said floating contaminant removing means comprises a drain pipe having an opening positioned above the liquid level of said floating tank section, said opening being adapted to receive said contaminants in said floating bubbles when the liquid level of said floating tank section is raised.

3. A filter device according to claim 1, wherein said liquid level regulating means comprises a shut-off device provided in said passage and adapted to selectively close said passage so as to interrupt a communication between said floating tank section and said discharging tank section, whereby raising the liquid level of said floating tank section.

4. A filter device according to claim 3, wherein said shut-off device comprises a gate plate slidable along said partition plate so as to selectively close said passage.

5. A filter device according to claim 3, wherein said shut-off device comprises a swingable gate plate pivotally secured to said partition plate so as to selectively close said passage.

6. A filter device according to claim 3, wherein said shut-off device is connected to a timer so that said pssage is closed intermittently by an operation of said timer.

7. A filter device according to claim 1, wherein said floating contaminant removing means comprises a trough opening upwardly positioned above the liquid level of said floating tank section and arranged horizontally and perpendicularly to the flow of the liquid.

8. A filter device according to claim 7, wherein said trough is located in said floating tank section.

9. A filter device according to claim 1, wherein said floating tank section is separated from said discharging tank section by a partition plate which includes said passage at a lower end portion of said partition plate.

10. A filter device according to claim 9, wherein said partition plate further includes an opening positioned above the liquid level of said floating tank section and said trough is located along said opening in said discharging tank section.

11. A dampening water circulating system comprising means for cleaning suspended contaminants from dampening water used in an offset press while minimizing consumption of said dampening water including:
   (i) a filter device having a filter tank, said filter device comprising:
      (a) a stirring tank section for receiving the contaminated liquid from said offset press and means feeding the stirring tank section arranged to form bubbles of the liquid therein and to allow the contaminants suspended by said liquid to be adsorbed by said bubbles;
      (b) a floating tank section formed at a downstream side of said stirring tank section as viewed in a direction of the flow of said liquid and arranged to allow said bubbles adsorbing the contaminants to float in the upper region of the liquid therein;
      (c) a discharging tank section communicated with said floating tank section at lower portions thereof through a passage such that liquid relatively free of conaminants is introduced from said floating tank section into said discharging tank section through said passage;
      (d) a floating contaminant removing means for removing said contaminants adsorbed in said floating bubbles, said means normally positioned above a liquid level of said floating tank section; and
      (e) a liquid regulating means for regulating the liquid level of said floating tank section, so that when the liquid level of said floating tank section is raised by said liquid level regulating means up to the position of said floating contaminant removing means, said contaminants adsorbed in said floating bubbles are removed through said floating contaminant removing means,
   (ii) a reserve tank communicated with said discharging tank section so as to receive the liquid free of the contaminants; and
   (iii) a circulating pump means for circulating said liquid in said reserve tank to the offset press.

12. A filter device comprising means for cleaning a supply of liquid contaminated with suspended contaminants while minimizing consumption of said supply of liquid including:
   a stirring tank section adapted to be supplied with the contaminated liquid;
   feeding means for conveying the contaminated liquid to the stirring tank section, said feeding means arranged to form bubbles therein and to allow the contaminant suspended by the liquid to be adsorbed by the bubbles;

a floating tank section formed downstream of and communicating with the stirring tank section for receiving said liquid for allowing said bubbles and contaminants adsorbed therein to float upwardly to an upper region of the liquid and with liquid relatively free of contaminants residing therebelow;

a discharging tank section communicating with the floating tank section through a submerged passage therebetween such that the liquid relatively free of contaminants is introduced into said discharging tank section through the passage;

a floating contaminant removing means for removing said contaminants adsorbed in the floating bubbles, said floating contaminant removing means positioned at a level above a normal liquid level of said floating tank section;

a liquid level regualting means for raising the liquid level of the floating tank section above said normal level to at least the level of the floating contaminant removing means so as to communicate the floating bubbles therewith, so that when the liquid level of the floating tank section is raised by the liquid level regulating means up to the level of the floating contaminant removing means, said contaminants adsorbed in the floating bubbles are removed through said removing means.

* * * * *